United States Patent [19]

Blank

[11] 4,057,284
[45] Nov. 8, 1977

[54] COLLAPSIBLE CAMPER

[76] Inventor: Paul Clifford Blank, Del Camino Place Rte. 4, Space 103, Longmont, Colo. 80501

[21] Appl. No.: 682,642

[22] Filed: May 3, 1976

[51] Int. Cl.² .............................................. B60P 3/34
[52] U.S. Cl. ..................................... 296/23 F; 52/66; 135/4 A; 296/23 G; 296/27
[58] Field of Search ................ 296/23 D, 23 F, 23 G, 296/23 H, 23 A, 23 C, 27; 135/1 A, 3 A, 4 A; 52/66, 67, 68

[56] References Cited

U.S. PATENT DOCUMENTS

| 3,083,047 | 3/1963 | Babbel | 296/23 H |
| 3,343,866 | 9/1967 | Massey | 296/27 |
| 3,488,085 | 1/1970 | Wallace | 135/1 A |
| 3,596,416 | 8/1971 | Hojka | 296/23 C |
| 3,862,526 | 1/1975 | Loughlin | 296/23 G |

Primary Examiner—Joseph F. Peters, Jr.
Assistant Examiner—John A. Carroll
Attorney, Agent, or Firm—Burton & Dorr

[57] ABSTRACT

A collapsible camper for use in the back of a pick-up truck or mounted on a set of travel wheels is designed to be in a compact and folded position during transit or storage and to unfold into a spacious camper at the desired site with a minimum of manual effort. A central floor is provided with opposing parallelepiped sections which fold outwardly from the longitudinal sides of the floor to increase the floor space as well as to provide a portion of the side walls of the camper. A canopy extends upwardly above the central floor portion to form the roof of the camper. The end walls of the camper fold upwardly from the central floor portion and interlock with the upstanding canopy to form the end walls of the camper. The side walls are formed from a plurality of stacked longitudinal plates which slideably unfold to interlock with each other thereby providing side walls between the canopy and the extended floor portions.

9 Claims, 15 Drawing Figures

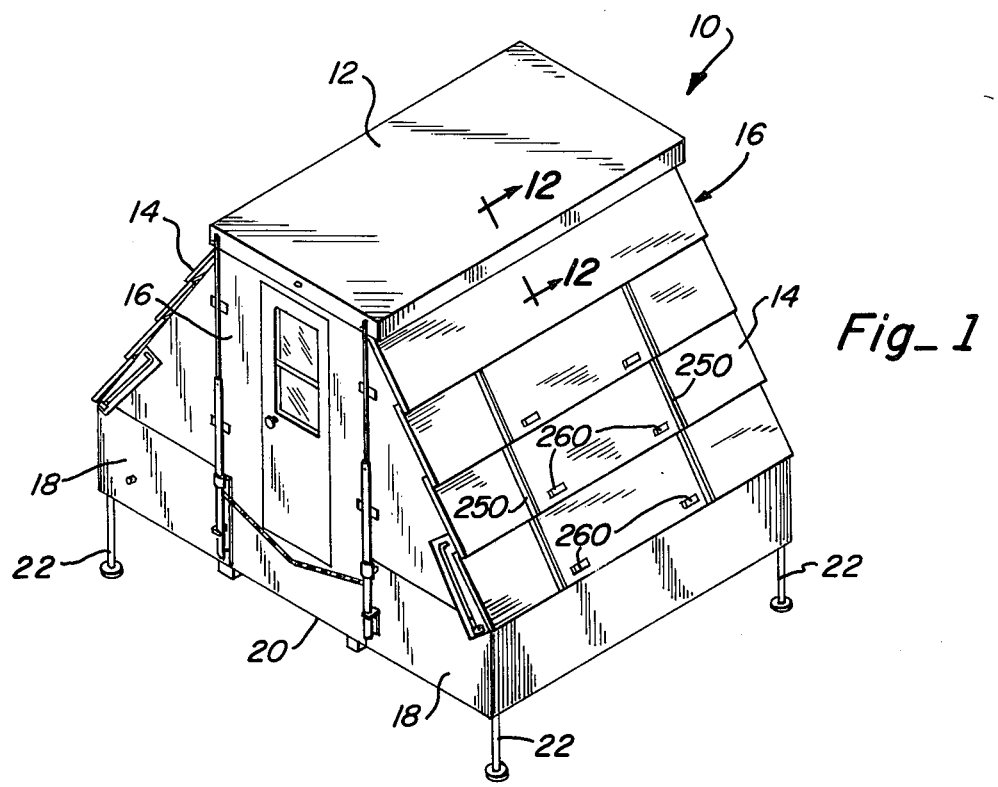
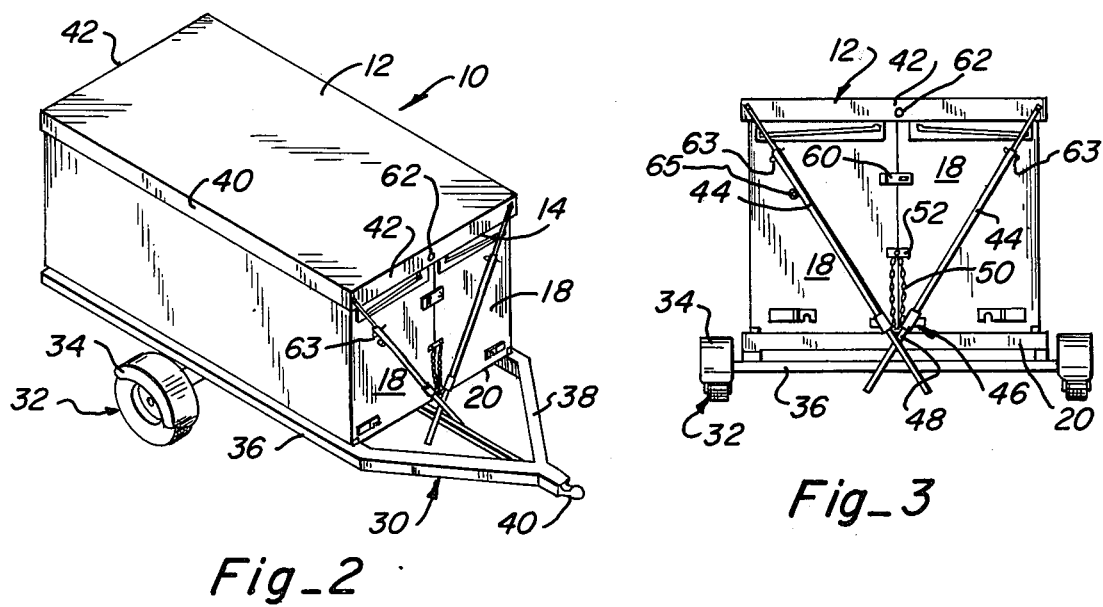

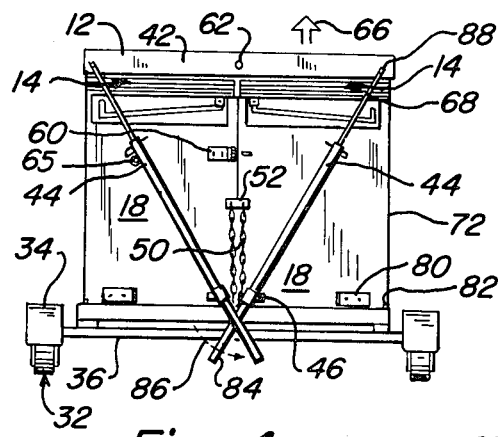
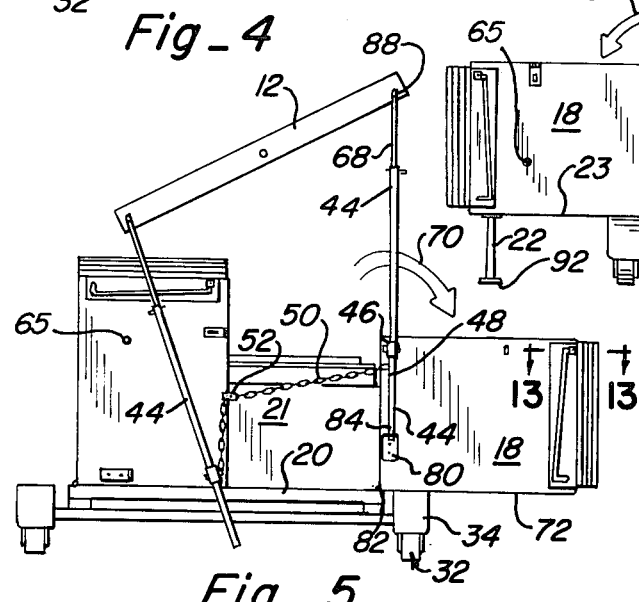
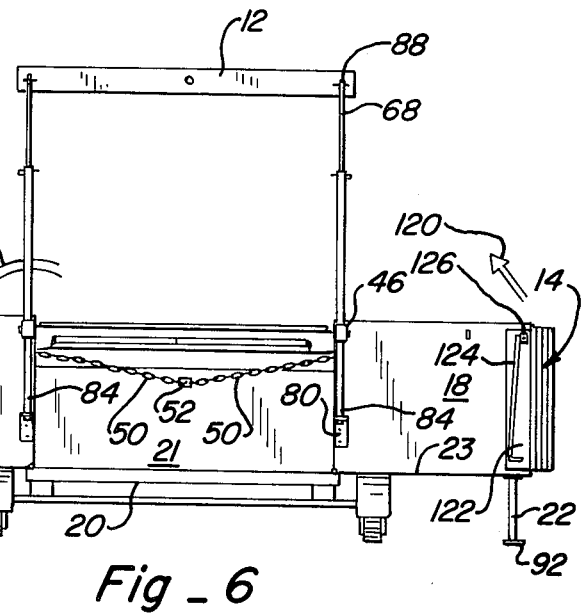
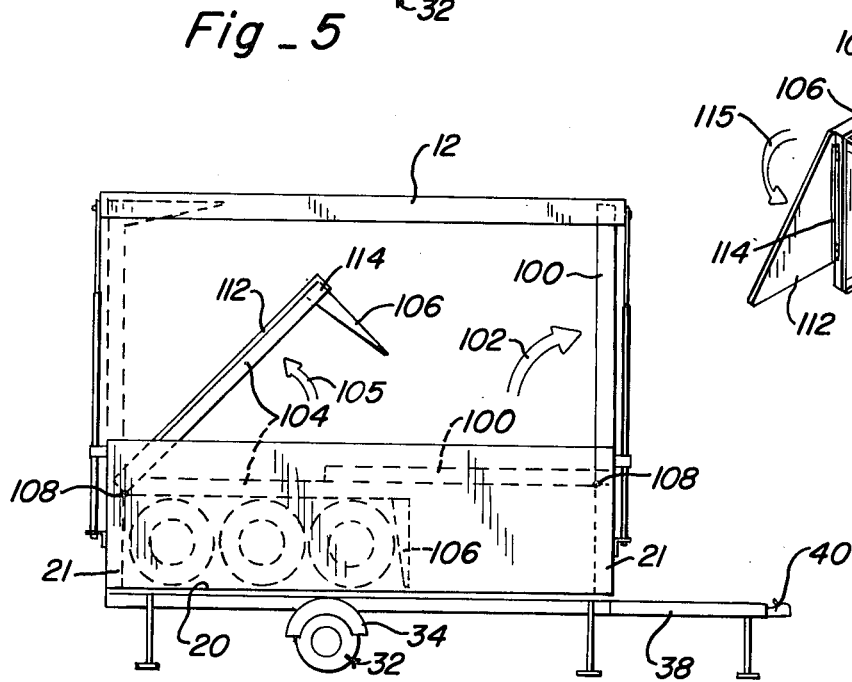
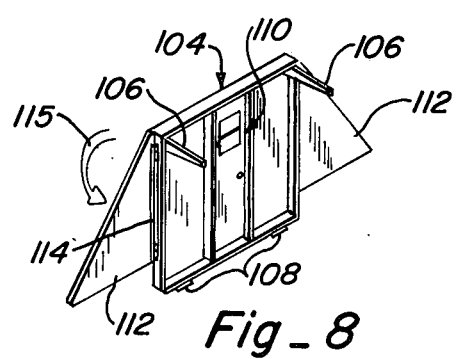

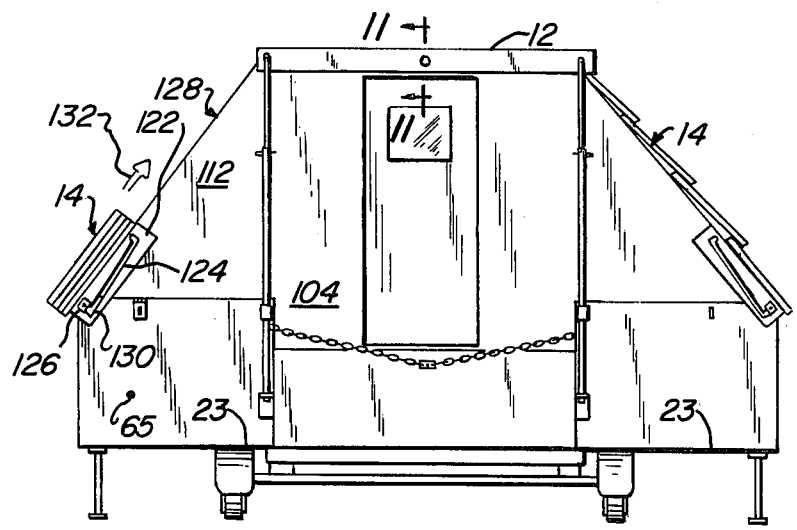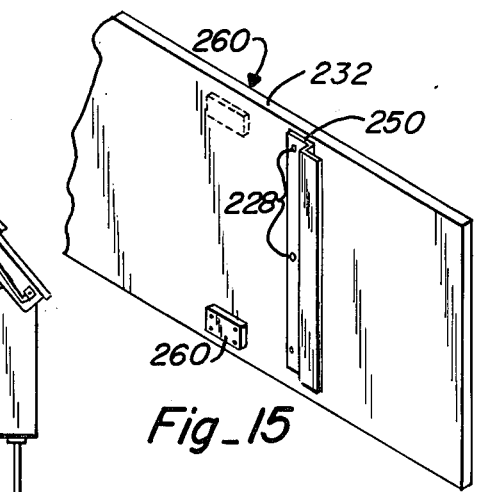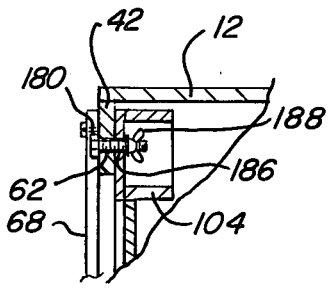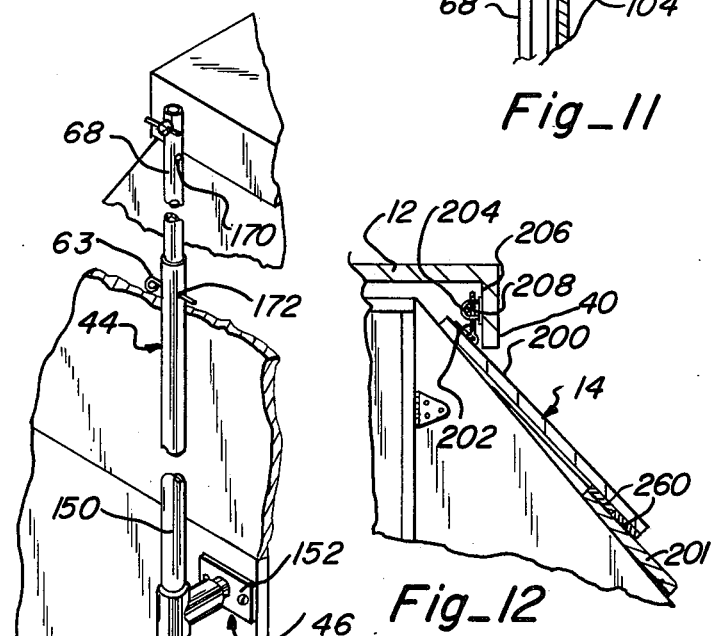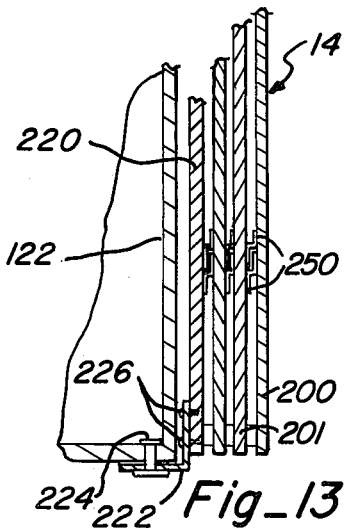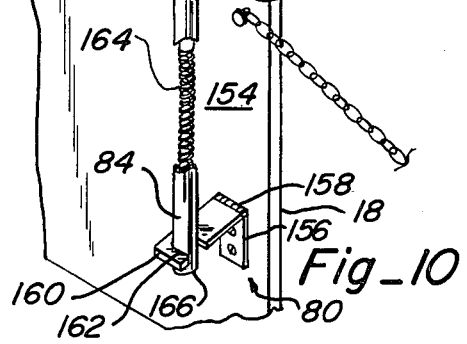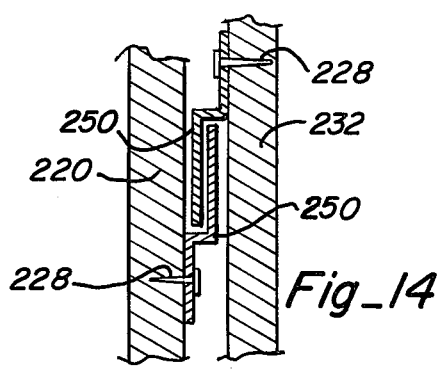
Fig_9 Fig_15 Fig_11 Fig_10 Fig_12 Fig_13 Fig_14

COLLAPSIBLE CAMPER

BACKGROUND OF THE INVENTION

1. Field of the Invention

The present invention relates generally to campers and more particularly to collapsible campers that are stored and transported in a highly compacted state but which expand into a spacious camper on site.

2. Description of the Prior Art

Collapsible campers have long been in use in the prior art. The following briefly describes some of the prior art campers as they relate to the present invention.

The July 13, 1965 U.S. Pat. No. 3,194,251 to Pettersen discloses a collapsible camper having an upwardly extending canopy which is supported by a plurality of rod members. Upstanding side walls are further provided as well as longitudinally extending side flaps which are hingedly attached thereto. Both the side walls and the side flaps are designed to fold inwardly by means of hinges upon each other and into the bed of the trailer. Canvas is positioned between the canopy and the upstanding side members to form the camper in the expanded state.

The prior art patent to Koon, U.S. Pat. No. 3,463,538, issued Aug. 26, 1969 teaches the use of an upwardly extended canopy forming the roof being mounted on four telescoping supports. A crank is further provided for raising the canopy which at the same time causes the side walls of the camper to extend outwardly in order to form the sides of the camper. The front and rear walls of the camper are further affixed to the canopy and raise and lower with the actuation of a crank. Thus, the entire camper can be assembled by actuation of only a crank mechanism.

The patent to Farnum, U.S. Pat. No. 3,429,608, issued Feb. 25, 1969 shows a similar arrangement to Koon in that through actuation of a crank a canopy can be upwardly extended. In Farnum, however, the operator then manually errects the sides of the camper into position. The operator further positions the end walls into place manually.

The British patent to Birch, British Pat. No. 457,169, issued on Nov. 23, 1936 teaches the use of an upwardly extending canopy serving as a roof to which is attached two flaps which form the side walls of the camper. Extendable supports are further positioned in the center of the camper for bracing the canopy.

The following prior art patents all teach the use of an integral upwardly extending canopy structures that serves as the roof of a camper: McCarthy, U.S. Pat. No. 3,560,042, Feb. 2, 1971; Daniels et al, U.S. Pat. No. 3,499,677, issued on Mar. 10, 1970; Kundsen, U.S. Pat. No. 3,632,153, issued on Jan. 4, 1972; Krutzikowsky, U.S. Pat. No. 3,288,520, issued on Nov. 29, 1966; Groh, U.S. Pat. No. 3,013,836, issued on Dec. 19, 1961; and Dontigny, U.S. Pat. No. 3,694,022, issued on Sept. 26, 1972.

The following prior art patents teach the use of a longitudinal outwardly extending side or box provided for extending the usable width of the trailer: Chase, U.S. Pat. Des. No. 177,086, issued on Mar. 13, 1956; Cox, U.S. Pat. No. 3,163,460, issued on Dec. 29, 1964; Larsson, U.S. Pat. No. 3,371,954, issued on Mar. 5, 1968; Smith, U.S. Pat. No. 3,062,579, issued on Nov. 6, 1962; Fischer, U.S. Pat. No. 3,032,369, issued on May 1, 1962; Da Silva, U.S. Pat. No. 3,556,581, issued on Jan. 19, 1971; Knowlton, U.S. Pat. No. 3,399,920, issued on Sept. 3, 1968.

Although the above prior art patents show various arrangements for collapsible trailers, none of the above patents provide for an easily manufactured, highly durable, and compact camper. The following problems are apparent with the above approaches. Those prior art approaches that use canvas or the like for side walls are not durable and long-lasting due to wear and possible tearing. It is well known, for example, that during transport of such collapsible campers such surfaces wear significantly due to the vibration of traveling. Those prior art approaches above that utilize one crank to completely erect the camper suffer from the malady of all components working, at all times, in complete harmony. While such systems operate effectively in the beginning, as they wear, various components fail and may prevent such automatic assembly of the camper. For example, it is known that on some of the above prior art approaches which utilize a crank for complete assembly thereof that after use and wear, whenever the camper is erected several positions might be presented in which the crank will encounter a severe force or stress. In such a case, the user, becoming familiar with the idiosyncrasies of the problems, usually has to tap, pound, or otherwise mechanically interfere with what should be an automatic assembly of the camper. Such approaches, therefore, are highly unacceptable in the consumer marketplace.

Some of the above prior art approaches are simply too complex thereby causing high manufacturing costs and resulting in consumer unacceptance due to their complexity.

The present invention overcomes the above difficulties by setting forth a unique arrangement of parts which can be quickly manipulated by the user in order to rapidly assemble a camper from a highly compacted state into a fully erected state. None of the above patents contemplate such a novel arrangement of component parts as herein disclosed for the present invention.

OBJECTS OF THE INVENTION

It is an object of the present invention to provide a new and improved collapsible camper for ease in mobility, ease in assembly, and that demonstrates long life and wearability.

It is another object of the present invention to provide a collapsible camper comprising a central floor portion in the bottom of the camper, structure on the opposing sides of the central floor for selectively extending the size of the central floor in the extended position and for folding over the floor in a collapsed position, an upstanding canopy that provides a roof to the camper when extended and provides a cover for the camper when collapsed, a highly compact side wall construction that extends to provide a solid side wall construction when erected and a stacked panel arrangement when collapsed, and end walls that can be quickly uplifted from the central floor portion and latched into place in the extended canopy.

It is a further object of the present invention to provide a collapsible camper having a central floor, opposing parallelepiped sections, each of which is pivotally connected to one of the longitudinal sides of the central floor portion, a canopy for providing a roof to the camper when extended and a cover over the folded parallelepiped sections when collapsed, end walls that are pivotally connected to the central floor which are substantially co-planar with the floor in the collapsed state and vertical thereto in the erected state, and means pivotally connected to the side of the parallelepiped sections for releasably forming side walls for said camper.

SUMMARY OF THE INVENTION

The present invention comprises a durable, compact camper which becomes spacious when erected. The camper of the present invention may be mounted on a set of travel wheels or in the back of a pick-up truck or the like. In the collapsed state, the camper takes on the configuration of a parallelepiped structure having a waterproof cover over the top thereof to prevent water and dust from entering. In the erected state, the camper becomes spacious with upstanding side and end walls and an overhead substantially flat canopy or roof.

The first step in erecting the camper from the collapsed state is to release the canopy and opposing identical parallelepiped folded sections from each other. The second step is the automatic release of the canopy section from serving as a cover over the parallelepiped sections to the roof of the camper due to the automatic uplifting effect of biased springs on each corner of the canopy. The next step is to manually swing out each of the parallelepiped sections thereby extending the floor space of the camper to it's maximum amount. At this stage, the canopy or roof of the camper has been erected in a central floor portion, has gained additional floor space, and is at it's maximum size. The next step of erection is the end placement of each of the end walls. Each end wall has an extendable wall portion folded over a center portion and in the collapsed stated, align themselves substantially in the same plane as the central portion of the camper floor. In the extended or unfolded state, each end wall is lifted upwardly to be perpendicular with the center floor portion and interlocks with the ends of the canopy. The extendable portions of each end wall are now unfolded to provide a substantially triangular shape to each of the end walls. Finally, stacked telescopic panels are uplifted on each side of the camper to form the walls.

Other objects, advantages and capabilities of the present invention will become more apparent as the description proceeds, taken in conjunction with the accompanying drawings.

DESCRIPTION OF THE DRAWINGS

FIG. 1 is a perspective view of the camper of the present invention expanded into an operational state.

FIG. 2 is a perspective view of the camper of the present invention in a fully collapsed state mounted upon a set of travel wheels.

FIG. 3 is a rear planar view of the camper of the present invention in the collapsed state.

FIG. 4 is a rear planar view of the camper of the present invention illustrating the release of the canopy section.

FIG. 5 is a rear planar view of the camper of the present invention illustrating the step of uplifting the canopy section and lifting out one of the parallelepiped sections.

FIG. 6 is a rear planar view of the camper of the present invention illustrating the step of manually extending the second parallelepiped section out onto the ground.

FIG. 7 is a side planar view of the camper as shown in FIG. 6 illustrating the step of manually lifting the end walls into place.

FIG. 8 is a detailed perspective view of one of the end walls of FIG. 7 containing the entry door.

FIG. 9 is an end planar view of the camper of the present invention illustrating the step of manually positioning the telescopic roof sections into place.

FIG. 10 is a detailed perspective view of the spring loaded canopy lifting tubes of the present invention.

FIG. 11 is a detailed cut away showing the interconnection of the canopy lifting tubes with the canopy.

FIG. 12 is a detailed cut away showing the latching interconnection of the telescopic roof sections with the canopy.

FIG. 13 is a detailed cut away showing the plurality of telescoping roof sections in the collapsed or stacked state.

FIG. 14 is a detailed enlargement of the telescopic interconnecting arrangements between the various sections.

FIG. 15 is a partial cut away of a telescopic roof section showing the interconnecting guide.

DESCRIPTION OF THE PREFERRED EMBODIMENT

In FIGS. 1 and 2 is shown the collapsible camper 10 of the present invention. In FIG. 1, the camper 10 of the present invention is shown in the expanded or erected state to comprise an upper canopy portion 12, telescoping roof sections 14, end walls 16, and protruding parallelepiped sections 18 extending from a central floor portion 20. In FIG. 1, the parallelepiped sections 18 are further supported to ground by means of stabilizing feet 22.

In the collapsed state of FIG. 2, the camper 10 of the present invention is preferably shown mounted on a trailer assembly 30 comprising travel wheels 32 with protective fenders 34. The camper 10 is shown mounted preferably on an angular steel frame 36 upon which is formed a tongue 38 and a ball hitch 40. In addition, the camper 10 may be releasably detachable from the trailer assembly 30 so that the trailer can be used for other uses. It is to be understood that the camper of the present invention 10 shown in FIG. 2 mounted to a conventional frame structure may also be adapted into the bed of a pick-up truck or the like. The disclosure of the travel trailer assembly 30 by no means limits or delimits the scope of this invention to the particular means of providing mobility to the camper.

The camper 10 of the present invention shown in the collapsed state in FIG. 2 illustrates the canopy 12 providing a cover over the various collapsed components of the camper 10. The canopy 12 as a cover effectively prevents rain and dirt from entering the collapsed camper. The telescoping roof sections 14 are stacked, in a manner to be subsequently discussed beneath the canopy 12 and the parallelepiped opposing sections 18 are oriented in a position of mutual abutment. The end walls 16, in a manner also to be more thoroughly discussed, are positioned above the floor portion 20 in the interior of the collapsed trailer 10. The telescoping feet 22 are also disposed on the interior of the camper 10. Thus, it is readily apparent, that the camper 10 of the present invention when in a collapsed state as shown in FIG. 2 is configured to orient all components of the camper into a highly compact collapsed state. Such compactness is highly desired in order to effectively reduce wind drag during movement of the camper, whether the camper is mounted on travel wheels or whether mounted in the back of a pick-up truck. In addition, such a highly compacted configuration is highly desirable for storage in a garage or the like when the camper 10 is not in use.

The erection of the camper from the collapsed state as shown in FIG. 2 into the fully expanded or erected state as shown in FIG. 1 will now be discussed. In FIG. 3, the camper 10 of the present invention is shown from its rear view. It is to be noted that if the travel trailer assembly 30 of FIG. 2 is used, the tongue 38 can be disconnected from the car or truck and suitably blocked to maintain the frame 36 level with the ground. It is to be noted that if the camper 10 of the present invention is disposed on the interior of a truck bed that the following discussion is also applicable thereto.

In FIGS. 2 and 3, the canopy 12 is shown to be of substantially rectangular shape having longitudinal downwardly extending sides 40 and transverse downwardly extending ends 42. The canopy 12 is somewhat larger than the combined rectangular shape of both parallelepiped sections 18 as shown in FIG. 3. Connected to each corner of the canopy 12 and on the transverse ends 42 is a canopy lifting tube 44. The detail of construction of the canopy lifting tubes 44 will be elaborated on in a later section. Suffice it to note that each canopy lifting tube 44 is connected to the parallelepiped sections at one point 46.

To commence erection of the camper 10, the hinged latch 60, shown in FIG. 3, is released on each end of the camper 10 in order to disconnect each parallelepiped section 18 from the other section. In addition, a pin 63 is removed from each canopy lifting tube 44 and an inwardly biased pin 65 is released.

In FIG. 4, the pins 63 are removed allowing the canopy 12 to lift upwardly in the direction of the arrow 66. At this time, an inner tubular portion 68 of the lifting tubes 44 commence to release. As will be discussed later, a coil spring internal to tube 44 causes the inner tubular member 68 to eject upwardly. After the inner tubes have reached their maximum travel, pins 63 are reinserted into new holes located below the previous holes. As shown in FIG. 4, the telescopic stacked roof sections 14 become visible. It is to be noted that when the canopy 12 was in the position as indicated in FIG. 3, the telescopic roof sections 14 were completely protected from exposure to the elements such as rain, dust, etc., during transit and during storage.

FIG. 5 illustrates the next step in the erection of the camper 10 of the present invention. In this step, one of the parallelepiped sides 18 is manually lifted downwardly in the direction of the arrow 70. Pin 65 prevents the canopy 12 from tipping in the wrong direction. The side edge 72 of the parallelepiped section 18 may abut the top of the fender 34 of the travel trailer 32. It is to be noted that in this configuration the fender 34 may provide some support to the parallelepiped section; the primary support, however, is the supports 22. Due to the outward orientation of the parallelepiped section 18, the chain 50 becomes fully extended between point 52 and the point 48 of connection to parallelepiped section 18. The chain 50 in this position firmly holds the parallelepiped section in place. Any conventional arrangement may be used.

In the process of extending the parallelepiped section 18 outwardly in the direction of the arrow 70, the stop block 80, as shown in FIG. 4, becomes oriented in a vertical position as shown in FIG. 5. The free end 84 pivots in the direction of arrow 86 as shown in FIG. 4 until it abuts the stop 80. The upper end 68 is substantially stationary due to its pivotal connection at point 88. Therefore, when the parallelepiped section 18 is pivoted about hinge 82 into the direction of arrow 70 by manual force, the tubular lifting tube 44 simultaneously undergoes movement in the direction of arrow 86 into a position as shown in FIG. 5. It is noted, that the corresponding lifting tube 44 on the opposing end of the camper 10 has also undergone a similar movement. Therefore, in FIG. 5, by outwardly releasing one parallelepiped section 18, one end of the canopy 12 is extended upwardly. Hinge 82 is not stressed due to its engagement of frame 36.

The next step in the erection of the camper 10 of the present invention is shown in FIG. 6. In FIG. 6, the remaining parallelepiped section 18 is manually lifted outwardly in the direction of arrow 90 in a similar manner as that discussed in FIG. 5 for the first parallelepiped section. When both parallelepiped sections 18 are lifted outwardly, the canopy 12 occupies a fully uplifted extended position. In that position, one end 84 of the lifting tube 44 abuts the connector 80, and the other end 68 is attached to the canopy portion at point 88. Of course, the mid-pivotal point 46 has remained connected to each parallelepiped section throughout the entire process. Both chains 50 for each correspondingly and opposing parallelepiped section 18 is firmly interconnected to a perpendicular end portion 21 of the camper at point 52.

Each parallelepiped section 18 is further supported to the ground by means of stabilizing feet 22 interconnected to a ground support pad 92. Each stabilizer foot 22 is slideably disposed into a corresponding but slightly larger diameter tube disposed in a conventional fashion on the interior of each parallelepiped section 18. It is to be expressly understood, that such stabilizer feet 22 can be either manually extended or automatically extended by means of a spring disposed in the support tube.

In FIG. 7 is shown the next step in erecting the camper 10 of the present invention. A first wall 100 is uplifted in the direction of arrow 102 and interconnects beneath the canopy 12 in a vertical engagement therewith. The remaining wall 104 having two downwardly projecting support members 106 is also uplifted, in the direction of arrow 105, into position beneath the canopy 12. Each wall 102 and 104 is connected via a piano hinge 108 to the upper edge of each perpendicular end portion 21 in order to facilitate such pivotal movement.

The details of the rear wall 104 is shown in FIG. 8 to include the main rear wall portion 104 comprising a rectangular frame-like structure having a conventional door 110 disposed therein. Protruding outwardly from the top end of the wall 104 are the support struts 105 which in the collapsed position of FIG. 7 serve to support both of the walls 100 and 104 above the central floor portion 20. And in the expanded position, as also shown in FIG. 7, the support struts 106 serve to support the canopy 12.

Folded and connected to each of the walls 104 and 102 are extending wall portions 112 which are interconnected to the main wall portion via piano hinges 114. Each extendable portion 112 is folded, initially, behind or on top of the wall portion. For example, for wall 104, shown in FIG. 7, the extendable portion 112, when wall 104 is in the collapsed state, is folded on top of wall 104 as shown in FIG. 7. However, before the wall portion 104 is extended upwardly to interconnect and engage the canopy 12, the extendable portion 112 is pivoted in the direction of arrow 115 in the trailer.

To summarize, the side portions 112 of wall 100 are folded out and then end wall 100 is manually lifted to engage the front end of the canopy 12. The side portions of wall 104 are lifted out and then rear wall 104 is then lifted upwardly in the direction of arrow 105 to engage the opposing end of the canopy 12.

The next step in the construction of the camper 10 of the present invention is shown in FIG. 6 when the stacked telescopic roof sections 14 are now lifted as a unit in the direction of arrow 120. Both ends of the stacked collapsible roof sections 14 are interconnected to a guide plate 122 having a slot 124 defined therein. The slot 124 engages a slide pin 126. The telescopic roof sections 14 through interaction between the guide 122 and the pin 126 are lifted into position along the sloped edge 128 of the extendable portion 112 of the end wall 104 as shown in FIG. 9. Due to the reverse bend 130 formed in the guide slot 124, the telescopic roof sections 14 are held in place by the weight of gravity against the reverse bend 130. The first telescopic roof portion is lifted in the direction of arrow 132 towards the canopy 12. In this manner, all of the telescopic roof sections 14 are uplifted and interconnect with each other to prevent the upper section from falling downwardly as shown in FIG. 9. The upper telescopic roof section is then interconnected with the canopy 12 in order to complete final assembly of the camper as shown in FIG. 1.

To briefly summarize, FIGS. 3 through 9 show step-by-step the erection of the camper 10 of the present invention from a collapsed state shown in FIG. 2 to a fully erected state shown in FIG. 1. The first step, as shown in FIG. 3, is to release the canopy 12 and to release the parallelepiped sections 18 from each other. The second step, as shown in FIG. 4, is the automatic release of the canopy section 12 from the parallelepiped sections 18 due to the spring biased uplifting effect of the tubular canopy lifting members 44. The next step, as shown in FIG. 5, is to manually swing out in the direction of arrow 70 the first parallelepiped section 18. The swinging out of this section causes the tubular lifting member 44 to fully extend the canopy 12 in an uplifted position and to become vertically aligned therewith. The next step, as shown in FIG. 6, is to manually swing out the remaining parallelepiped section 18 in the direction of arrow 90. This, in turn, causes the remaining set of canopy lifting members 44 to uplift the canopy 12 so that the canopy 12 is now in the upwardly extended position. At this stage, the canopy or roof 12 of the camper has been erected and the central floor portion 20 has gained additional floor space 23 appearing at the bottom of each parallelepiped section 18. The next step of erection is shown in FIG. 7 to be the placement of the end walls. The first end wall 100 has its extendable wall portions folded out and then the wall 100, and its folded portions 112, are uplifted in the direction of arrow 102 to form the front wall 100. The remaining wall 104 now has its extendable portions 112 folded out and the wall 104 is uplifted into position in the direction of arrow 105 to engage the under-surface of the canopy 12. Finally, as shown in FIG. 6, the stacked telescopic sections are uplifted as a unit into the position as shown in FIG. 9. These telescopic portions are held in position along the sloped or slanting edge 128 of the extendable portion 112 so that each of the telescoping sections can be lifted into place for attachment or connection beneath the canopy 12.

The details of the various components will now be discussed. The details of the spring loaded canopy lifting tubes 44 are shown in FIG. 10 to include a main outer tube 150 being connected at a substantially midpoint position to the pivotal connector 46. The pivotal connector 46 is affixed by means of a mounting plate 152 to the end 154 of a parallelepiped section 18. Any conventional pivot connector 46 may be utilized in the present invention. It is noted that four connectors 46 are required in the present embodiment. Free end 84 of the outer tubular portion 150 has a closed bottom wall 166 and engages stop 80. In the present invention, stop 80 is preferably composed of a mounting plate portion 156 also affixed to side 154 of parallelepiped section 18 and being further connected at a pivot point 158 to the stop member 160 which has formed therein a slot or mouth 162. Disposed in the upper end of the outer tubular portion 150 is an inner tubular portion 68 which abuts against an inner coiled spring 164 that is biased against the bottom wall 166 of the free end 84. In the collapsed state as shown in FIG. 2, the inner tubular member 68 forcedly biases the springs 164 into a fully compressed state. However, when pin 63 is removed from hole 170, the inner tubular member biases upwardly as shown in FIGS. 5 and 6. As shown in FIG. 10, the pin 63 is now inserted into a new hole 172 of the inner tube 168. In that fashion, the spring 164 has fully extended the tubular section 68 upwardly and pin 63 positions the inner tubular member 68 in a fixed relationship with the outer member 150.

In FIG. 11, is shown the details of the connection point for either wall 100 or 104. The connection point comprises a bolt 180 disposed through a hole 62 in the side 42 of the canopy 12. When wall 104 is extended upwardly, a correspondingly formed hole 186 engages the bolt 180 and a wing nut 188 affixes the wall 104 to the canopy 12. Any of a number of conventional fasteners may be utilized in the present invention to affix wall 104 to the canopy 12.

In FIG. 12, the connection of the telescoping roof sections 14 to the canopy 12 is shown. Affixed onto the surface of the upper roof section 200 is a pivotal stem 202 that contains a hook latch 204. Disposed on the inner surface 206 along the side edge 40 of the canopy 12 is a hook catch 208. Therefore, as the last roof section 200 is slid into place, the pivotal pin member containing the hook 204 is inserted into the hook catch 208. It is to be noted, that any rain, whether normal or wind blown, is prevented from entering into the interior of the camper 10 of the present invention due to the fact that the upper roof section 200 enters under, for a substantial distance, the canopy 12. In the preferable embodiment, these hook latches and catches 204 and 208 are provided at each corner of the canopy 12.

In FIGS. 13 through 15 are shown further details of the telescopic roof sections 14. In FIG. 13, the first or innermost roof section 220 is firmly affixed to the guide plate 122 by means of an angle bracket 222 which is bolted through the guide 122 with bolt 224. The innermost roof section 220 is then firmly attached by means of bolts or screws 226 to the angle bracket 222. This arrangement appears at both ends of the innermost roof section 220. Interlocking angle guides 250 are provided at both ends of each panel 232 for providing a track on which each panel 232 slides when the outermost panel is pulled in the direction of arrow 132 towards the canopy along edge 128 of protrusion 112. One of these guides 250 is shown in FIG. 15. The interlocking arrangement is shown in more detail in FIG. 14 wherein each angled guide 250 is attached to the panel by means of nails or screws 228. In FIG. 14, angle guide 250 is connected to the innermost panel 220 and the next subsequent panel 232 engages the guide on panel 220 in an interlocking fashion. It is obvious that on the end opposing the location of the guide 250 on panel 220 shown in FIG. 14 that the guide on that opposing end is directed towards guide 250 on panel 220. Such an arrangement presents each successive panel from longitudinal movement along the side of the camper 10. In addition to the provision of guides 250, blocks 260 are provided on opposing sides of each telescoping panel 232 as shown in FIG. 15. As the first telescoping panel 200 is lifted in the direction of arrow 132 of FIG. 9, the block 260 on panel 200 engages block 260 on the next successive panel 201 as shown in FIG. 12. In this manner, not only are each of the succeeding telescoping panels provided with guides at each end, but blocks 260 are provided at each end so that each successive telescoping panel engages with the next successive panel as they are pulled upwardly in the direction of arrow 132 towards the canopy 12.

The remaining construction of the camper 10 is primarily rectangular frame construction and can be manufactured from any suitable material including wood, plastic, or the like. The canopy 12 with downwardly extending sides 40 and 42 is of the same rectangular construction and may be suitably coated with vinyl or the like in order to provide a more weather-enduring surface.

Although the present invention has been described with a certain degree of particularity, it is understood that the present disclosure has been made by way of example and that changes in detail and structure may be made without departing from the spirit thereof.

I claim:

1. A collapsible camper having two opposing longitudinal sides, said camper comprising:
   means in the bottom of said camper for providing a central floor portion,
   means on each of said opposing sides for selectively extending the size of said central floor portion, said floor extending means being selectable between a first expanded position and a second collapsed position,
   means cooperative with said floor extending means for uplifting a canopy over said camper when said floor extending means moves to said first position, and
   means on each of said opposing sides of said central floor portion and cooperative with said floor extending means for forming side walls between said floor extending means and said uplifted canopy, each of said side wall forming means including a plurality of sliding panels, means attached to each of said panels for guiding the sliding movement of each panel relative to an adjacent panel, and, means attached to each of said panels for limiting the sliding movement of each panel relative to an adjacent panel, each of said side wall forming means further including means for mounting one of said sliding panels to a respective one of said floor extending means and means for removeably attaching a second of said sliding panels adjacent to said uplifted canopy whereby said second sliding panel can be moved away from said floor extending means toward said uplifted canopy and attached adjacent thereto to slide said plurality of sliding panels relative to each other to form one of said side walls and said second sliding panel can be removed from attachment adjacent said uplifted canopy and moved toward said floor extending means to slide said plurality of sliding panels relative to each other to collapse said side wall.

2. The collapsible camper of claim 1 wherein said means for mounting said one sliding panel of each side wall forming means to said respective floor extending means includes a first member having an elongated slot and a pin member slideably receivable in said slot and mounted to said respective floor extending means whereby said plurality of sliding panels can be moved as a unit in the collapsed state relative to the respective floor extending means by moving the slotted member relative to the pin member.

3. The collapsible camper of claim 1 wherein said guide means include at least two angled guide members spaced from each other and mounted to each panel, the angled guide members of adjacent panels being supported in a mating relationship.

4. A collapsible camper comprising:
   a central floor having two opposing longitudinal sides and two ends,
   opposing parallelepiped sections, each being pivotally connected to one of said longitudinal sides along one edge of said section for enlarging the floor in a first orientation and for folding over said floor in a second collapsed orientation, when said opposing sections are both collapsed, said floor and said sections together forming a parallelepiped configuration, each of said parallelepiped sections comprising two end walls and two longitudinal sides contiguous and perpendicular to each other, the first side forming said enlarged floor and the second side forming a vertical side portion of said camper when said parallelepiped section is in said first orientation,
   a canopy covering said configuration for providing a roof to said camper when extended,
   support means connected to said canopy and to said sections for holding said canopy in a first position above said central floor and for latching said canopy in a second position to cover over the top of said parallelepiped configuration,
   means pivotally connected to said ends of said central floor for forming end walls, the aforesaid means oriented in a plane substantially parallel to said central floor portion in a first collapsed position and extending vertically from said floor to said canopy in a second extended position, and
   means connected to one side of said section for forming a side wall from said extended floor portion to the longitudinal edge of said canopy.

5. The collapsible camper of claim 4 in which the top of said canopy is larger than but substantially corresponds in shape to said central floor, said canopy having downwardly extending edges formed around its periphery.

6. A collapsible camper comprising:
   a central floor having two opposing longitudinal sides and two ends,
   opposing parallelepiped sections, each being pivotally connected to one of said longitudinal sides along one edge of said section for enlarging the floor in a first orientation and for folding over said floor in a second collapsed orientation, when said opposing sections are both collapsed, said floor and said sections together forming a parallelepiped configuration, a canopy covering said configuration for providing a roof to said camper when extended, support means connected to said canopy and to said sections for holding said canopy in a first position above said central floor and for latching said canopy in a second position to cover over the top of said parallelepiped configuration, said support means comprises tubular telescoping supports connected at one end to an end of said parallelepiped section and at the second end to a corner edge of said canopy, each of said tubular supports extending vertically from the base of said camper at a point near a corner of said central floor to said corner or said canopy when said canopy occupies said first position, means pivotally connected to said ends of said central floor for forming end walls, the aforesaid means oriented in a plane substantially parallel to said central floor portion in a first collapsed position and extending vertically from said floor to said canopy in a second extended position, and means connected to one side of said section for forming a side wall from said extended floor portion to the longitudinal edge of said canopy.

7. The collapsible camper of claim 6 in which each of said tubular supports automatically extends to hold said canopy in said first position.

8. A collapsible camper comprising:

a central floor having two opposing longitudinal sides and two ends, opposing parallelepiped sections, each being pivotally connected to one of said longitudinal sides along one edge of said section for enlarging the floor in a first orientation and for folding over said floor in a second collapsed orientation, when said opposing sections are both collapsed, said floor and said sections together forming a parallelepiped configuration, a canopy covering said configuration for providing a roof to said camper when extended, support means connected to said canopy and to said sections for holding said canopy in a first position above said central floor and for latching said canopy in a second position to cover over the top of said parallelepiped configuration.

means pivotally connected to said ends of said central floor for forming end walls, the aforesaid means oriented in a plane substantially parallel to said central floor portion in a first collapsed position and extending vertically from said floor to said canopy in a second extended position, each of said end wall means having a central portion having parallel longitudinal side edges, said central end wall pivotally connected at its lower edge to one end of said central floor and capable of engaging the top of said canopy at one end, and opposing side sections, each being pivotally connected to one of the aforesaid longitudinal side edges, each of said side sections forming part of said end wall in an expanded state and folding over said central portion in a collapsed state, and means connected to one side of said section for forming a side wall from said extended floor portion to the longitudinal edge of said canopy.

9. A collapsible camper comprising:

a central floor having two opposing longitudinal sides and two ends, opposing parallelepiped sections, each being pivotally connected to one of said longitudinal sides along one edge of said section for enlarging the floor in a first orientation and for folding over said floor in a second collapsed orientation, when said opposing sections are both collapsed, said floor and said sections together forming a parallelepiped configuration, a canopy covering said configuration for providing a roof to said camper when extended, support means connected to said canopy and to said sections for holding said canopy in a first position above said central floor and for latching said canopy in a second position to cover over the top of said parallelepiped configuration, means pivotally connected to said ends of said central floor for forming end walls, the aforesaid means oriented in a plane substantially parallel to said central floor portion in a first collapsed position and extending vertically from said floor to said canopy in a second extended position, means connected to one side of said section for forming a side wall from said extended floor portion to the longitudinal edge of said canopy, each of said side wall forming means comprises a plurality of sliding panels, one panel of each plurality having means for mounting said one panel to one of said parallelepiped sections, a second panel of each plurality having means for removeably attaching said second panel adjacent said canopy when said canopy is in said second position, each of said plurality of panels further including means to interconnect adjacent panels whereby each of said second panels can be moved away from said respective parallelepiped section toward said canopy in said second position and attached adjacent thereto to slide said plurality of sliding panels relative to each other to form one of said side walls and said second sliding panel can be removed from attachment adjacent said uplifted canopy and moved toward said floor extending means to slide said plurality of sliding panels relative to each other to collapse said side wall.

* * * * *